(12) United States Patent
Hall et al.

(10) Patent No.: US 9,661,122 B1
(45) Date of Patent: *May 23, 2017

(54) SECURE REMOTE ACTUATION SYSTEM WITH LOW POWER FUNCTION

(71) Applicants: David R. Hall, Provo, UT (US); Mark Hall, Springville, UT (US); Craig Boswell, Draper, UT (US)

(72) Inventors: David R. Hall, Provo, UT (US); Mark Hall, Springville, UT (US); Craig Boswell, Draper, UT (US)

(*) Notice: Subject to any disclaimer, the term of this patent is extended or adjusted under 35 U.S.C. 154(b) by 0 days.

This patent is subject to a terminal disclaimer.

(21) Appl. No.: 15/414,859

(22) Filed: Jan. 25, 2017

Related U.S. Application Data (63) Continuation of application No. 14/461,166, filed on Aug. 15, 2014, now Pat. No. 9,608,834, which is a
(Continued)

(51) Int. Cl.
| | |
|---|---|
| *H04M 1/72* | (2006.01) |
| *H04M 1/725* | (2006.01) |
| *H04L 29/08* | (2006.01) |
| *H04W 12/08* | (2009.01) |
| *H04L 12/28* | (2006.01) |
| *H04L 12/24* | (2006.01) |
| *H04W 76/04* | (2009.01) |
| *G05B 15/02* | (2006.01) |

(52) U.S. Cl.
CPC ........ *H04M 1/72533* (2013.01); *G05B 15/02* (2013.01); *H04L 12/2803* (2013.01); *H04L 12/2816* (2013.01); *H04L 41/28* (2013.01); *H04L 67/02* (2013.01); *H04W 12/08* (2013.01); *H04W 76/046* (2013.01)

(58) Field of Classification Search
CPC ........... H04M 1/72533; H04L 12/2803; H04L 41/28; H04L 41/22; H04L 12/2816; H04L 67/02; H04W 12/08; H04W 76/046; G05B 15/02; E05B 43/005; G08B 21/24; G08B 25/008; G08B 25/10; G07C 9/00182; G06F 3/04847
USPC .............................................. 340/5.22, 10.3
See application file for complete search history.

(56) References Cited

U.S. PATENT DOCUMENTS

| | | | |
|---|---|---|---|
| 5,872,513 A * | 2/1999 | Fitzgibbon ............ | E05B 43/005 235/382 |
| 7,498,936 B2 * | 3/2009 | Maeng ................... | G08B 21/24 340/10.3 |

(Continued)

*Primary Examiner* — Ali Neyzari (57) ABSTRACT

A secure remote actuation system with a low power function is described herein. The system may comprise a remote input receptor and a network. The remote input receptor may comprise a user interface for receiving user inputs from a user and firmware having stored thereon instruction for executing a low power function. The network may comprise a combination of computer systems interconnected by telecommunications equipment or cables allowing information to be exchanged. The network may also comprise a network device for obtaining the user inputs from the remote input receptor. One or more acceptable inputs may be stored on the network. In the present invention, the network device obtains the user inputs from the remote input receptor while the user is using the user interface and then the network compares the user inputs to the acceptable inputs.

20 Claims, 5 Drawing Sheets

Related U.S. Application Data continuation-in-part of application No. 14/323,549, filed on Jul. 3, 2014, and a continuation-in-part of application No. 14/323,618, filed on Jul. 3, 2014, and a continuation-in-part of application No. 14/461,128, filed on Aug. 15, 2014, and a continuation-in-part of application No. 15/400,313, filed on Jan. 16, 2016.

(56) References Cited

U.S. PATENT DOCUMENTS

| | | | | |
|---|---|---|---|---|
| 9,608,834 | * | 3/2017 | Hall | H04L 12/2803 |
| 2002/0014954 A1* | | 2/2002 | Fitzgibbon | G07C 9/00182 |
| | | | | 340/5.64 |
| 2016/0004229 A1* | | 1/2016 | Hall | G05B 15/02 |
| | | | | 700/275 |
| 2016/0004230 A1* | | 1/2016 | Hall | G05B 15/02 |
| | | | | 700/275 |
| 2016/0050082 A1* | | 2/2016 | Hall | G05B 15/02 |
| | | | | 715/736 |

* cited by examiner

SECURE REMOTE ACTUATION SYSTEM WITH LOW POWER FUNCTION

CROSS REFERENCE TO RELATED APPLICATIONS

This application is a continuation of U.S. patent application Ser. No. 14,461,166 filed on Aug. 15, 2014, which is a continuation-in-part of U.S. patent application Ser. No. 14/323,549 filed on Jul. 3, 2014; U.S. patent application Ser. No. 14/323,618 filed on Jul. 3, 2014; and U.S. patent application Ser. No. 14/461,128 filed on Aug. 15, 2014; all entitled "Secure Remote Actuation System," the entirety of each incorporated by reference herein. This application is also a continuation-in-part of U.S. patent application Ser. No. 15/400,313 filed Jan. 16, 2016 entitled "An Apparatus for Retrieving Parcels," the entirety of which is incorporated by reference herein.

BACKGROUND OF THE INVENTION

The present invention relates generally to remote actuation systems comprising devices capable of performing remote operations. Examples of typical remote actuation systems include thermostats, which may control heating and cooling devices from a remote location, and garage door openers, which may provide remote access to secured areas. The remote portions of such devices commonly require a portable power source, such as a battery or photovoltaic cell. It is also typical of such devices to comprise communications means, such as a radio frequency transceiver, to receive and/or relay information.

For example, U.S. Pat. No. 8,331,544 to Kraus et al., which is incorporated herein for all that it discloses, describes a system that remotely operates a door lock. The door lock may be powered by a battery and be configured to send and receive radio frequency signals as part of a mesh network. In such a mesh network, each connected device acts as a communication node that can send and receive packets of information to any other device in the network. The door lock may further comprise a memory module where individual user codes are stored and a logic module to compare user codes to input codes at the door to allow access decisions to be made at the door without transmissions.

Such systems typically require continuing communications over a network that may cause rapid consumption of power. Thus, various attempts have been made to conserve power in 25 such systems. For example, U.S. Pat. No. 4,614,945 to Brunius, et al., which is incorporated herein for all that it discloses, describes communicating information between a plurality of instrument monitoring units to a remotely located data collection unit. The monitoring units are radio frequency transponder circuits that are operatively connected to one or more instruments whose parameters are being monitored. The transponders continuously monitor one or more parameters of the instrument(s) with which they are associated. The transponders collect and accumulate parameter information and/or data from their associated instruments and continually listen for a "wake-up" signal from an interrogate receiver/data collection unit.

Despite these advances in the art, improved means of conserving power in remote actuation systems is desirable.

BRIEF SUMMARY OF THE INVENTION

A secure remote actuation system may comprise a remote input receptor and a network. The remote input receptor may comprise a user interface for receiving user inputs from a user. The network may comprise a combination of computer systems interconnected by telecommunications equipment or cables allowing information to be exchanged. The network may also comprise a network device for obtaining the user inputs from the remote input receptor. One or more acceptable inputs may be stored on the network. In the present invention, the network device obtains the user inputs from the remote input receptor while the user is using the user interface and then the network compares the user inputs to the acceptable inputs.

The remote input receptor may also comprise a communication device, such as a radio frequency transceiver, for sending the user inputs to the network device. The remote input receptor may further comprise a portable power source, such as a battery or solar panel.

The remote input receptor may be capable of executing a low power function after the user inputs are received from the user, wherein power is cut from unneeded subsystems and reduced in others until reactivated. The remote input receptor may exit the low power function when the user begins to use the user interface again.

The remote input receptor may additionally comprise a surveillance device to detect the user, such as a camera, a microphone, a proximity sensor, or a combination thereof. The remote input receptor may then exit the low power function when the surveillance device detects the user.

The user interface may comprise buttons, a visual display, capacitive sensors, a microphone, a vibration recognition module, a proximity sensor, a fingerprint scanner, a retina scanner, a voice recognition module, or a combination thereof as a means for receiving acceptable inputs from a user.

The remote input receptor may comprise data connection ports. Such data connection ports may be disposed in an interior of the remote input receptor.

The network may comprise a software application allowing for an individual to control the acceptable inputs. For example, the software application may allow the individual to edit, add, or delete the acceptable inputs from the network, change parameters, change personal settings, alter system firmware, and/or conduct diagnoses.

The network device may further comprise an internal memory unit for storing the acceptable inputs, the user inputs, a history of user inputs, input parameters, and/or access parameters. Additionally, the network may be operably connected to and capable of controlling various actionable devices, such as a thermostat, a television, an automated window, automated blinds, a ventilation system, a sprinkler system, a lighting element, an indoor positioning system, an access control device, or a combination thereof. The access control device may be an electromechanical locking mechanism or a garage door opener that may secure an enclosed area, room, building, or delivery box.

DETAILED DESCRIPTION OF THE INVENTION

Figure 1:
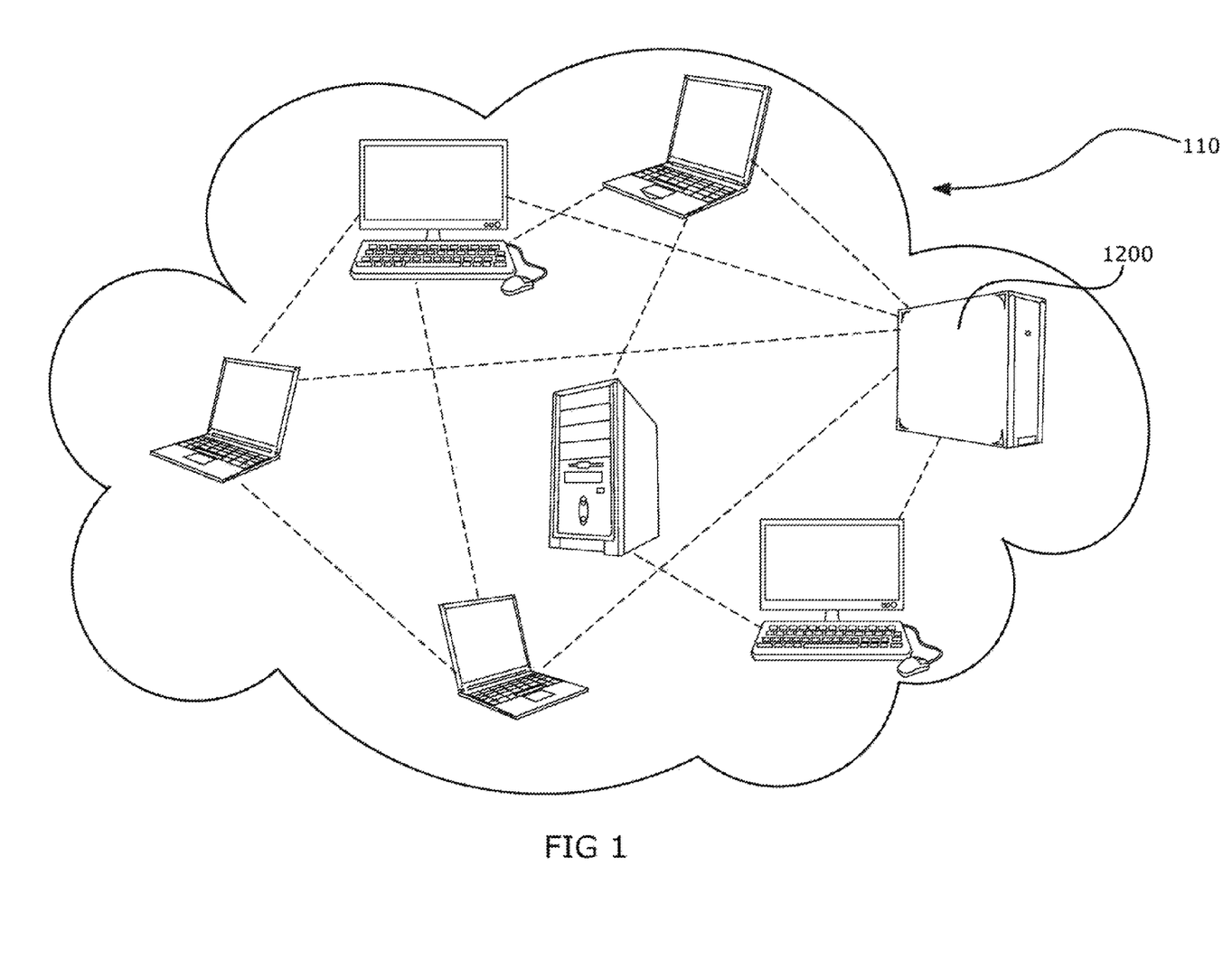
FIG. 1 is a schematic representation of an embodiment of a network device operably 15 connected to a network.

FIG. 1 shows an embodiment of a network device 1200 forming a part of a network 110. The network 110 may comprise a combination of computer systems interconnected by telecommunications equipment or cables allowing information to be exchanged. In various embodiments, network devices may comprise a desktop or laptop computer, a cell phone, a computer server, or other devices capable of communicating on such a network.

Figure 2:
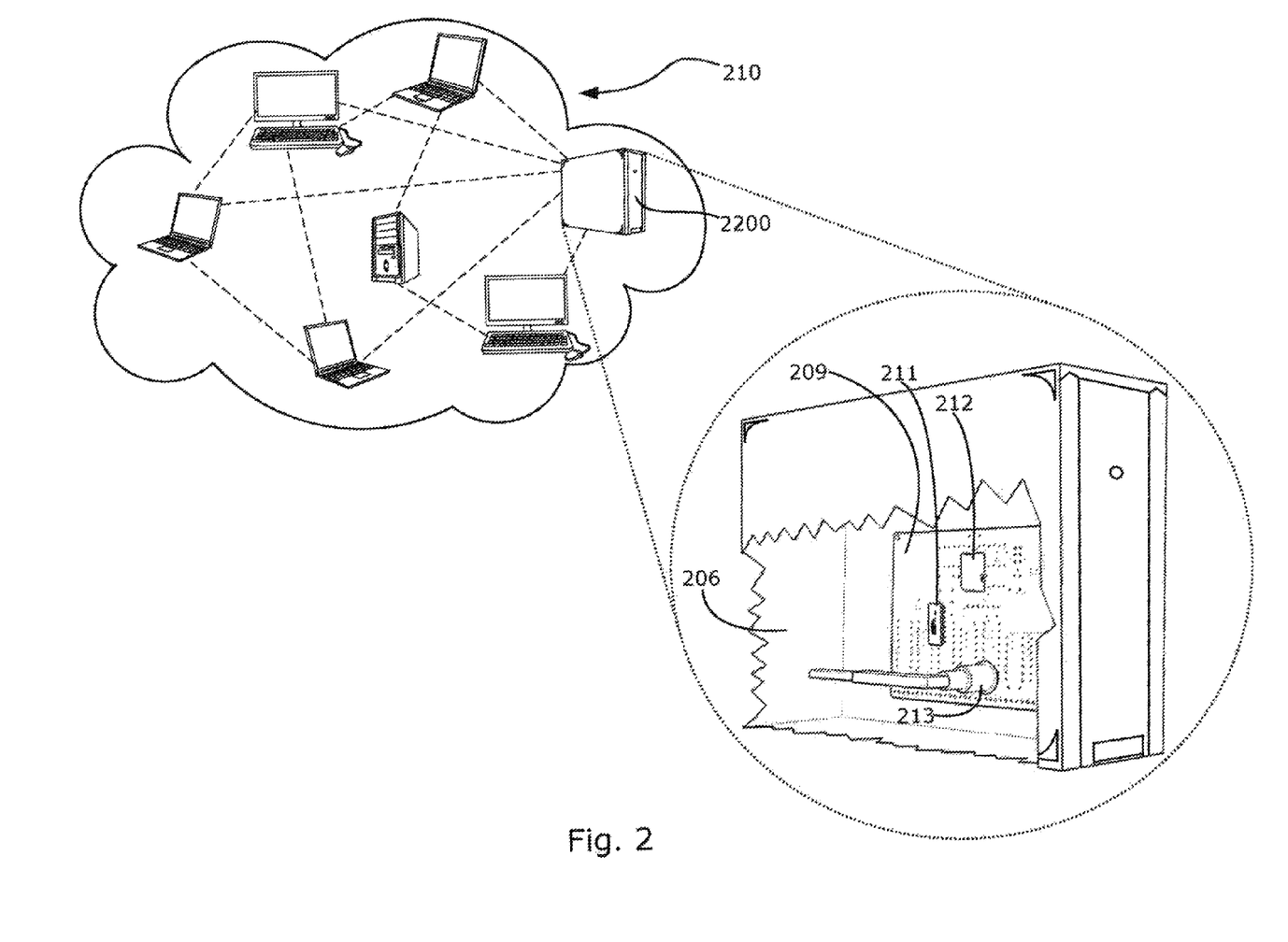
FIG. 2 is a partially cutaway perspective view of an embodiment of a network device forming part of a network, the network device comprising a plurality of components supported by a printed circuit board disposed therein.

FIG. 2 shows an interior 206 of an embodiment of a network device 2200 forming part of a network 210. The network device 2200 may comprise a plurality of components supported by a printed circuit board 209 disposed therein. For instance, the embodiment of the network device 2200 shown comprises a microcontroller 211 and an internal memory unit 212 capable of obtaining and storing one or more user inputs from a remote input receptor (not shown). The network device 2200 may also comprise a communication device 213, such as a radio frequency transceiver, for receiving the one or more user inputs. The radio frequency transceiver may be a universal device capable of communicating with a plurality of other devices by reciprocating various radio frequency transmissions.

Figure 3A:
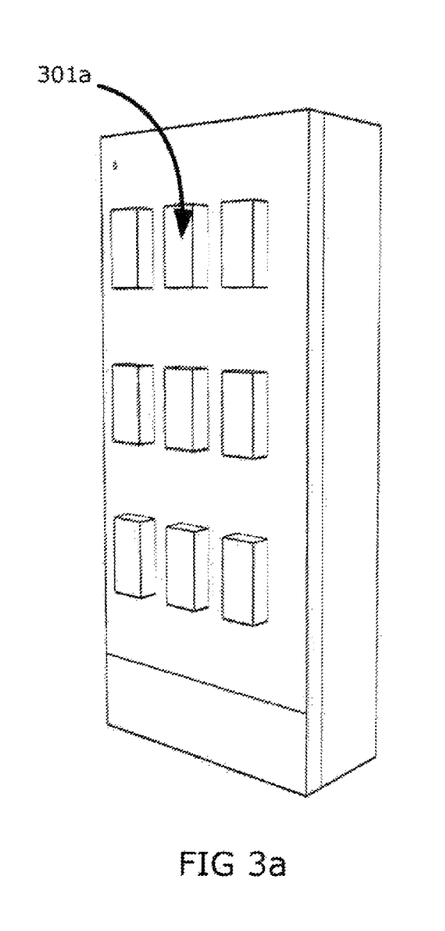
FIG. 3a is a perspective view of an embodiment of a remote input receptor.
Figure 3B:
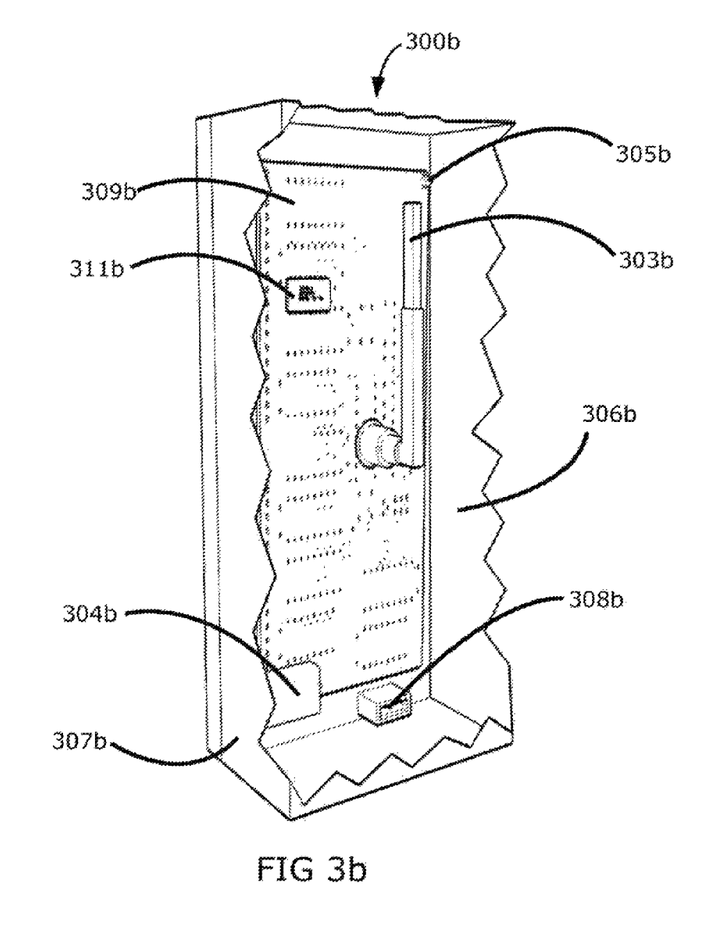
FIG. 3b is a partially cutaway perspective view of an interior of the remote input receptor shown in FIG. 3a comprising a plurality of components supported by a printed circuit board disposed therein.

FIGS. 3a and 3b show a perspective view and a partially-cutaway perspective view, respectively, of an embodiment of a remote input receptor 300b comprising an interface 301a and an interior 306b with a plurality of components supported by a printed circuit board 309b disposed therein.

The printed circuit board 309b may support at least a microcontroller 311b and a communication device 303b. After a user supplies one or more user inputs, the remote input receptor 300b may transmit the one or more user inputs to a network (not shown). The network may store and compare one or more acceptable inputs to the one or more user inputs. If the one or more user inputs correspond with the one or more acceptable inputs, the network may perform an operation.

The communication device 303b may comprise a radio frequency transceiver or other known communication apparatus. The communication device 303b may communicate at a sub-1 GHz frequency. It may be appreciated by those of ordinary skill in the art that communications at sub-1 GHz frequencies may be more capable of propagating through environmental obstacles, such as a plurality of walls in a residential home, than communications at frequencies higher than 1 GHz. It may therefore be desirable for said communication device 303b to transmit signals at a sub-I GHz frequency. In some applications, it may be desirable to communicate at a 2.4 GHz or 5.8 GHz frequency to achieve compatibility with other devices, such as those that communicate using ZigBee, Z-Wave, Bluetooth, or Wi-Fi.

The remote input receptor 300b may be powered by a portable power source 304b, such as one or more galvanic or voltaic batteries, one or more solar cells, or other known means of portable power. The remote input receptor 300b may execute a low power function after a user has submitted a user input to the user interface 301a. Such a low power function may be executed for a predetermined amount of time or until a user starts to use the user interface 301 a again. When the low power function is executed, the remote input receptor 300b may cut power from unneeded subsystems and reduce power in others until reactivated. This low power function, combined with not requiring continuous intermittent communication with the network, may enable the portable power source 304b of the remote input receptor 300b to last significantly longer than portable power sources of other known remote actuation systems.

The remote input receptor 300b may further comprise one or more surveillance devices 305b, such as a security camera, a microphone, a proximity sensor, or other known surveillance means. For example, a security camera may be disposed within the interior 306b of the remote input receptor 300b, with a lens of the camera extending through an exterior 307b of the remote input receptor 300b. The one or more security devices 305b may continuously gather and transmit information from an environment to a network (as shown in FIG. 1). Additionally, the one or more surveillance devices 305b may trigger the remote input receptor 300b to exit the low power function when the one or more surveillance devices 305b detect a user.

The remote input receptor 300b may comprise one or more data connection ports 308b for interacting with firmware of the remote input receptor 300b, such as altering or updating the firmware, running system diagnostics, or managing acceptable inputs and/or input parameters. In some embodiments, such firmware functions may also be performed via a network (not shown). The one or more data connection ports 308b may be disposed on the interior 306b of the remote input receptor 300b to aid in preventing undesired access or accumulation of debris from the surrounding environment. The one or more data connection ports 308b may be able to be accessed by detaching a portion of the exterior 307b of the remote input receptor 300b.

Figure 4A:
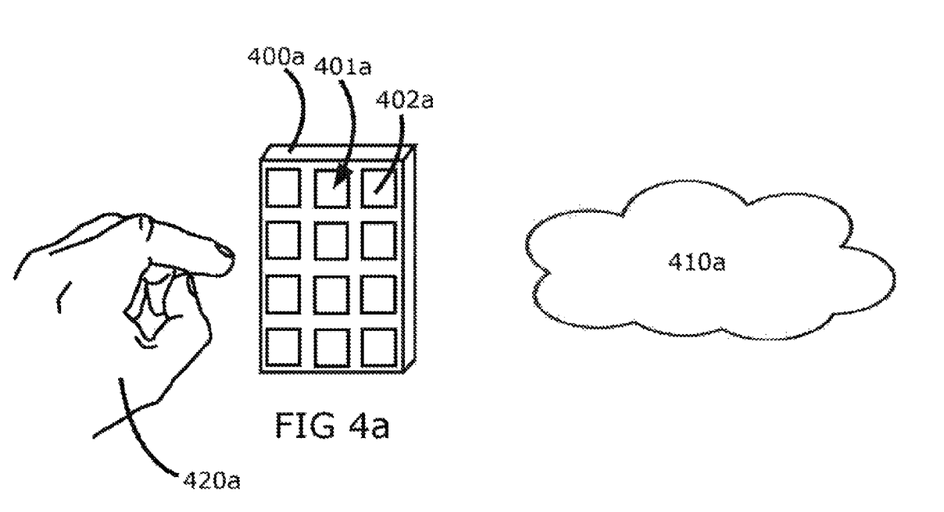
FIGS. 4a and 4b are perspective views of an embodiment of a portion of a user and a remote input receptor comprising a user interface and operably connected to a network.

FIG. 4a shows an embodiment of a remote input receptor 400a, a network 410a, and a user 420a. The remote input receptor 400a may comprise a user interface 401a for receiving one or more user inputs from the user 420a. The user interface 401a shown comprises one or more buttons 402a. Such user interfaces may also comprise a visual display, one or more capacitive sensors, a microphone, a vibration recognition module, a proximity sensor, a fingerprint scanner, a retina scanner, a voice recognition module, or other known interfacing means.

Figure 4B:
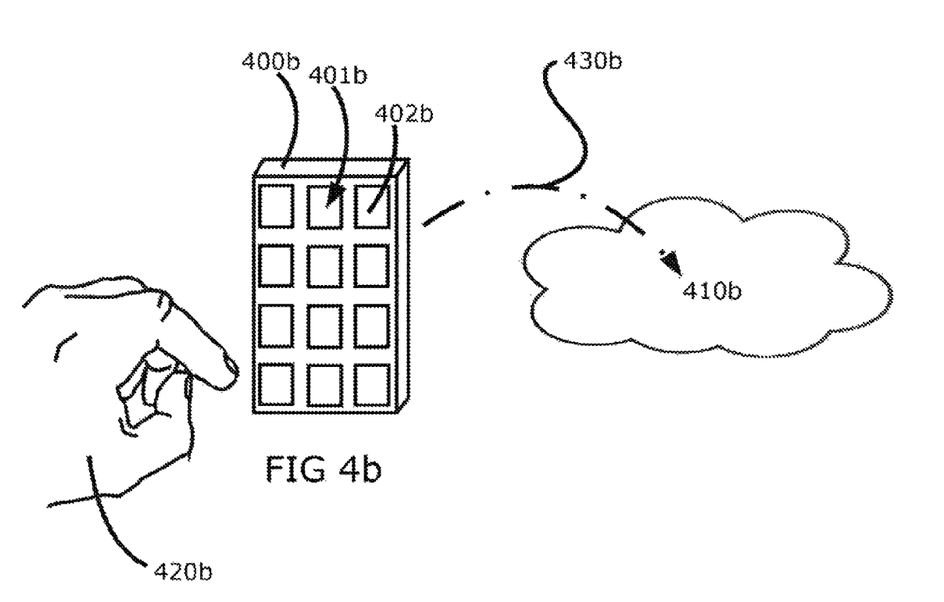

FIG. 4b shows an embodiment of a user 420b supplying one or more user inputs into a remote input receptor 400b by pressing at least one button 402b on a user interface 401b. The one or more user inputs may comprise a keystroke, or any other action receivable by a user interface. As the user 420b supplies each of the one or more user inputs to the user interface 401b, the remote input receptor 400b may send a signal 430b representing each of the user inputs to a network 410b. The network 410b may perform an operation upon receipt of a correct succession of signals or deny an operation upon receipt of an incorrect succession of signals.

Figure 5:
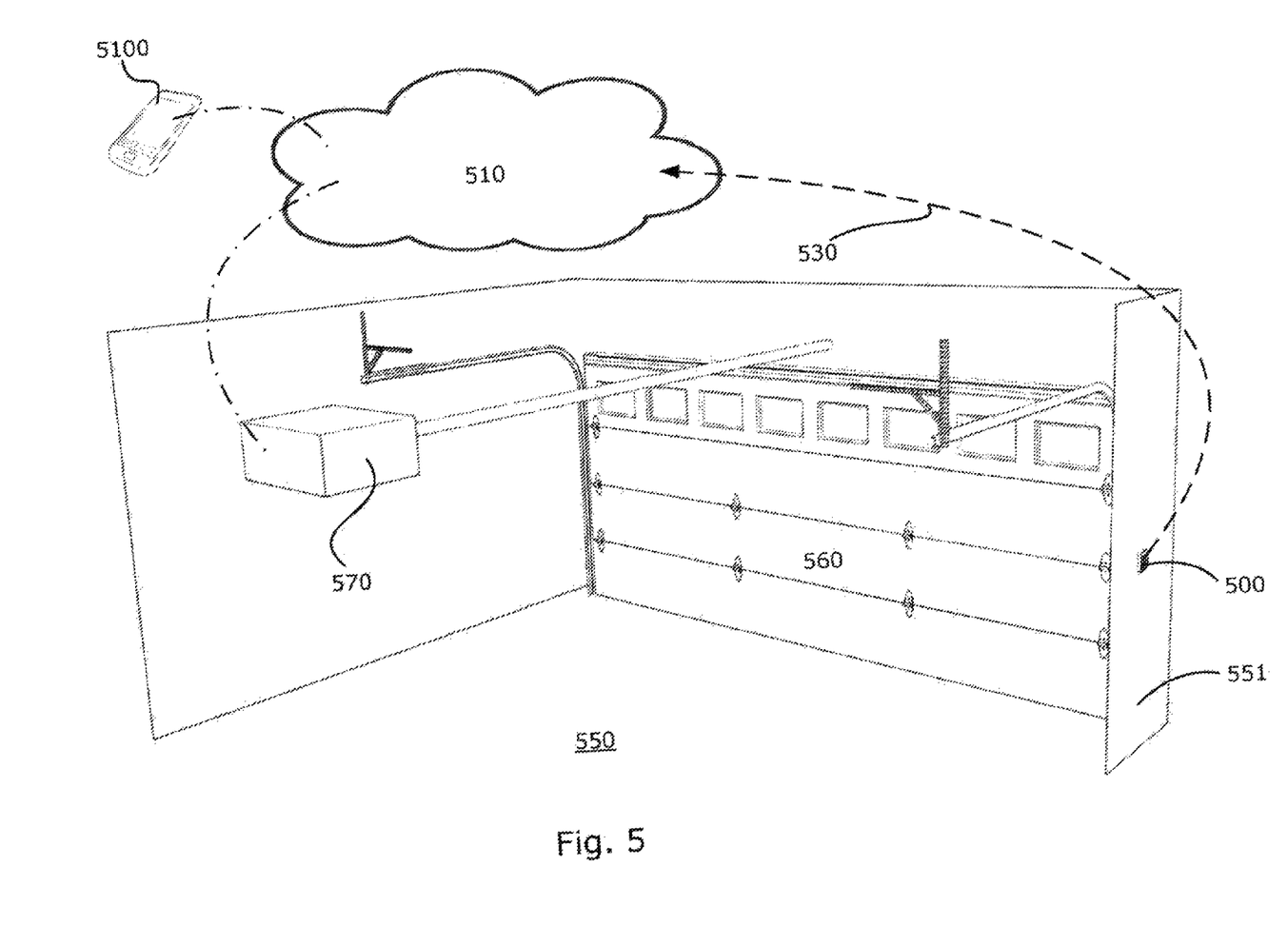
FIG. 5 is a perspective view of elements of an embodiment of a secure remote actuation system associated with an enclosed area.

FIG. 5 shows an embodiment of an enclosed area 550 comprising an access barrier 560, such as a door, for blocking or allowing access to the enclosed area 550. The access barrier 560 may comprise an actionable device 570, such as a garage door motor or a door lock, for permitting or denying access to the enclosed area 550. A network 510 may be operably connected to the actionable device 570, wherein the network 510 is capable of actuating the actionable device 570.

A remote input receptor 500 capable of receiving one or more user inputs may be disposed in, near, or on an exterior 551 of the enclosed area 550. The remote input receptor 500 may be connected to the network 510 via a wireless connection 530. As a user begins supplying a user input to the remote input receptor 500, the network 510 may obtain the user input from the remote input receptor 500. For example, if a user supplies one or more user inputs to the remote input receptor 500, the remote input receptor 500 may send the user inputs to the network 510. If the user inputs are found to be acceptable at the network 510, such as being one of a list of acceptable inputs, the network 510 may perform an operation, such as opening or closing the access barrier 560, or engaging or disengaging a door lock.

In various embodiments, an actionable device may comprise an access control device, such as an electromechanical door lock, a garage door motor, or another access restricting mechanism. Actuation of the access control device may comprise an opening of a door or an engagement or disengagement of a lock. In these embodiments, a user may gain access to a secure area by supplying inputs to a remote input receptor that match one or more acceptable inputs. In other embodiments, an actionable device may comprise a thermostat, a television, an automated window, automated blinds, a ventilation system, a sprinkler system, a lighting element, an indoor positioning system, or other such devices known in the art.

The network 510 may comprise one or more electronic devices 5100. In the embodiment shown, the one or more electronic devices 5100 comprises a smartphone. However, other embodiments of an electronic device may comprise a laptop or desktop computer, a tablet, or other devices capable of communicating over such a network. The electronic device 5100 may comprise a software application for management of the network 510 including creating, deleting, or editing one or more acceptable inputs.

Additionally, the software application may be used to create, delete, or edit one or more input parameters. Such input parameters may be used to determine one or more conditions upon which an actuated system may operate. For example, the one or more input parameters may comprise a predetermined user interface interaction sequence, such as a combination of keystrokes supplied by a user, a combination of user inputs, a predetermined sequence of user inputs, a time window during which the network 510 may receive one or more user inputs, a limitation on which one or more user inputs may be supplied to gain access to the secure area 550, or a limitation on how many times one or more user inputs may be received by the network 510.

Whereas the present invention has been described in particular relation to the drawings attached hereto, it should be understood that other and further modifications apart from those shown or suggested herein, may be made within the scope and spirit of the present invention.

We claim:

1. A secure remote actuation system, comprising:
    a remote input receptor comprising a user interface for receiving one or more user inputs from a user and having firmware stored thereon that executes a low power function that prevents continuous intermittent communication;
    a cloud-based network storing one or more acceptable inputs and comprising a network device for obtaining said one or more user inputs from the remote input receptor;
    wherein the network device obtains said one or more user inputs from the remote input receptor while the user is using the user interface; and
    wherein the cloud-based network compares said one or more user inputs to said one or more acceptable inputs.

2. The secure remote actuation system of claim 1, wherein the low power function is executed for a predetermined amount of time.

3. The secure remote actuation system of claim 1, wherein the remote input receptor reduces power in one or more subsystems as the low power function is executed.

4. The secure remote actuation system of claim 3, wherein the remote input receptor cuts power from unneeded subsystems as the low power function is executed.

5. The secure remote actuation system of claim 3, wherein the remote input receptor reduces power in one or more essential subsystems as the low power function is executed.

6. The secure remote actuation system of claim 1, wherein the remote input receptor executes the low power function after said one or more user inputs is received from the user.

7. The secure remote actuation of claim 1, wherein the remote input receptor exits said low power function when the user begins to use the user interface.

8. The secure remote actuation system of claim 1, wherein the remote input receptor further comprises one or more communication devices for sending said one or more user inputs.

9. The secure remote actuation system of claim 8, wherein the one or more communication devices comprises a radio frequency transceiver.

10. The secure remote actuation system of claim 9, wherein the network device comprises a second radio frequency transceiver that wirelessly communicates with the remote input receptor radio frequency transceiver.

11. The secure remote actuation system of claim 1, wherein the remote input receptor further comprises a portable power source.

12. The secure remote actuation system of claim 1, wherein the remote input receptor further comprises a surveillance device to detect the user.

13. The secure remote actuation system of claim 1, wherein the user interface comprises buttons, a visual display, one or more capacitive sensors, a microphone, a vibration recognition module, a proximity sensor, a fingerprint scanner, a retina scanner, a voice recognition module, or a combination thereof.

14. The secure remote actuation system of claim 1, wherein the remote input receptor comprises one or more data connection ports.

15. The secure remote actuation system of claim 1, wherein the cloud-based network comprises a combination of computer systems interconnected by telecommunications equipment or cables allowing information to be exchanged.

16. The secure remote actuation system of claim 1, wherein the network device comprises one or more memory units for storing: said one or more acceptable inputs; said one or more user inputs;
    a history of user inputs; one or more input parameters; one or more access parameters; or a combination thereof.

17. The secure remote actuation system of claim 1, wherein the cloud-based network is operably connected to and controls one or more actionable devices.

18. The secure remote actuation system of claim 1, wherein the user input comprises an action by a user receivable by the remote input receptor.

19. The secure remote actuation system of claim 18, wherein the user input comprises one or more keystrokes.

20. The secure remote actuation system of claim 1, wherein the remote input receptor is disposed on an exterior of an enclosed area.

\* \* \* \* \*